United States Patent [19]
Lamkewitz et al.

[11] 4,436,064
[45] Mar. 13, 1984

[54] PROCESS AND APPARATUS FOR DETERMINATION AND UTILIZATION OF A QUANTITY OF PREHEATING ENERGY

[75] Inventors: Falk Lamkewitz, Munich; Josef Riedmaier, Pentenried, both of Fed. Rep. of Germany

[73] Assignee: Webasto-Werk W. Baier GmbH & Co., Fed. Rep. of Germany

[21] Appl. No.: 279,599

[22] Filed: Jul. 1, 1981

[30] Foreign Application Priority Data

Jul. 2, 1980 [DE] Fed. Rep. of Germany ....... 3024983

[51] Int. Cl.³ ............................................. F02N 17/02
[52] U.S. Cl. ........................... 123/142.5 R; 236/46 R; 123/142.5 E
[58] Field of Search .............. 236/46 R; 123/142.5 R, 123/142.5 E

[56] References Cited

U.S. PATENT DOCUMENTS

| | | | |
|---|---|---|---|
| 3,870,855 | 3/1975 | Edlund et al. | 123/142.5 E |
| 3,964,676 | 6/1976 | Rooks et al. | 236/46 R |
| 4,040,565 | 8/1977 | Christiansen | 236/46 A |
| 4,106,690 | 8/1978 | Tomlinson | 236/46 R |
| 4,172,555 | 10/1979 | Levine | 236/46 R |
| 4,176,785 | 12/1979 | Allard et al. | 236/46 R |
| 4,186,874 | 2/1980 | Jensen | 236/46 R |
| 4,192,274 | 3/1980 | Damon | 123/142.5 R |
| 4,319,711 | 3/1982 | Barker et al. | 236/46 R |

*Primary Examiner*—Ira S. Lazarus
*Attorney, Agent, or Firm*—Antonelli, Terry & Wands

[57] ABSTRACT

A preheating process and apparatus for determination and utilization of a quantity of preheating energy so as to automatically achieve a desired temperature at a given location prior to a predetermined period of usage, especially for preheating an automotive vehicle. In accordance with the process, the respective preheating times required to achieve a desired temperature for various possible actual conditions at the location of usage are determined and stored, at a predetermined point of time prior to the usage commencement time, the correct preheating time is determined from the stored preheating times based upon actual temperature conditions and application of heat to the location is automatically commenced at a time prior to the usage commencement time that corresponds to the difference between the usage commencement time and the correct preheating time determined previously. In accordance with a preferred embodiment of the apparatus, a presettable timer actuated switching control means is provided for actuating a heating device. An actual temperature value sensor means is utilized to sense the actual temperature at the location to be preheated and is used to address a memory unit containing, as stored data, preheating times to be read out that correspond to the respectively required heating time to achieve a desired temperature for each of various possible actual temperatures at the location. The stored preheating time read out by the memory unit based upon actual temperature value sensed by the sensor means at a point of time prior to the preset usage commencement time is utilized by the switching control means to actuate the heating device at a time prior to a preset time for commencement of usage that corresponds to the difference between the preset usage commencement time and the time read out by the memory unit.

22 Claims, 4 Drawing Figures

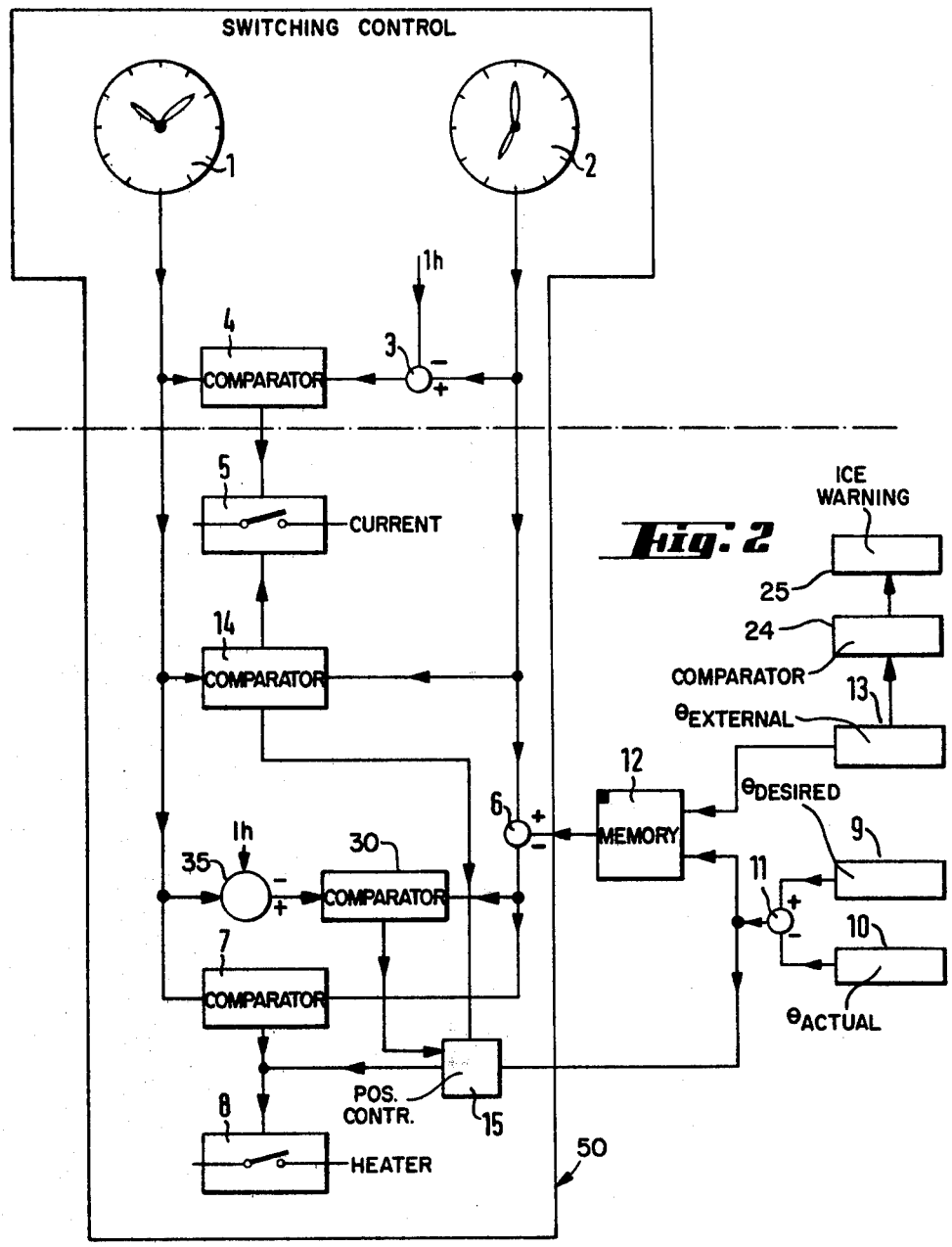

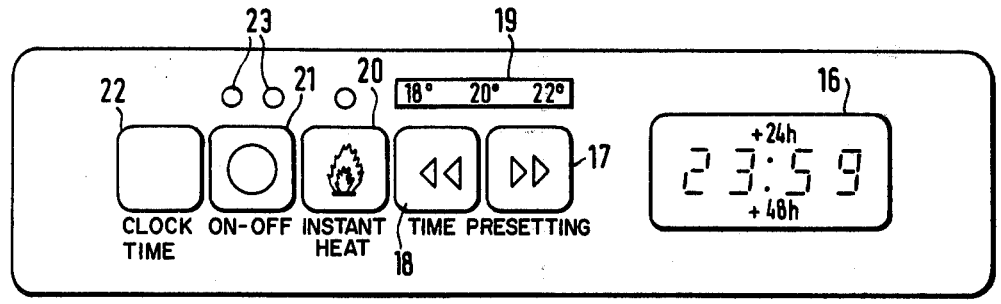
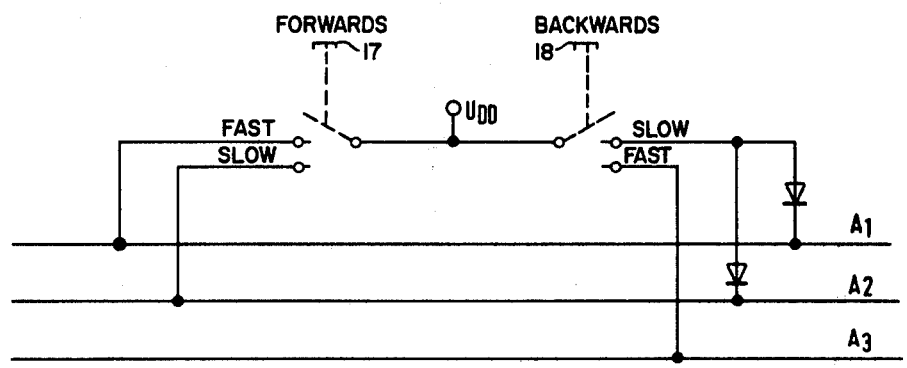
| FUNCTION | A1 | A2 | A3 |
|---|---|---|---|
| FORWARDS SLOW | 0 | 1 | 0 |
| FORWARDS FAST | 1 | 0 | 0 |
| BACKWARDS SLOW | 1 | 1 | 0 |
| BACKWARDS FAST | 0 | 0 | 1 |
| 00:00 SET | 1 | 0 | 1 |

PROCESS AND APPARATUS FOR DETERMINATION AND UTILIZATION OF A QUANTITY OF PREHEATING ENERGY

BACKGROUND AND SUMMARY OF THE INVENTION

The present invention relates to a process and apparatus for automatically applying a quantity of heat energy sufficient to achieve a desired temperature at a given location prior to a period of usage, especially for preheating an automotive vehicle. However, the invention is also applicable to other situations where automatic preheating would be desirable, for example for internal combustion engines serving for driving machines at building sites, which engines are to be preheated at the start of operation, or similar purposes.

Preheating systems are known (Webasto "Technische Mitteilung" [Technical Report] E 2-10) wherein the heater is turned on prior to an intended period for commencement of its utilization for a time period that is estimated and set beforehand. The maximum preheating period is one hour. If a relatively high outside temperature will supposedly prevail during the time of use, for example for the intended start up time of an automobile, then according to data obtained from experience, a substantially shorter preheating time will be set. Thus, for a correct estimation of the turning-on time, a certain amount of experience is required which, however, leads to erroneous results should weather conditions change considerably after setting the timer clock and before the set time for commencement of preheating has been reached. If severe freezing occurs in the meantime, the set preheating time will be too short, and the preheating result will be unsatisfactory. On the other hand, if conditions become mild, too long a preheating time will be utilized, with the outcome that an unnecessarily high temperature will be reached and an inordinately high amount of energy consumed.

It has been known (German utility model No. 1,765,291), in order to limit energy consumption, to install in a heater circuit a two-position controller that is responsive to temperature and which will cut off application of heat once a desired temperature has been obtained. However, if this control method is to be effective in the case of suddenly occurring cold, then the maximum preheating time must be set; after attainment of the desired temperature, which occurs earlier or later dependent on the actual weather conditions, the controller turns off any further heating. But this procedure still leads to a considerable squandering of energy, since equipment to be heated up, especially in automobiles, are not thermally insulated so that the cutting in of the preheating feature that will be too early in most instances, has the result that the equipment is maintained at the desired temperature for an unnecessarily long time period prior to utilization, and heat and energy is wasted due to its transmission to the environment.

Accordingly, it is an object of the present invention to be able to obtain a desired preheating result with a minimum energy consumption and with maximum safety. This object has been obtained in accordance with a preferred embodiment of the invention by a process wherein the preheating times required to achieve a desired temperature for various possible actual temperatures at a given location are determined, at a predetermined point of time prior to a preset utilization commencement time, a correct preheating time for use based upon actual temperature conditions is automatically selected from those preheating times previously determined, and then application of heat is automatically commenced at the given location at a time prior to the usage commencement time corresponding to the difference between the usage commencement time and the correct preheating time. This method according to the present invention can advantageously be carried out in accordance with a preferred embodiment of the apparatus of the present invention which includes a heating device, a presettable timer actuated switching control means for actuating the heating device, and actual temperature value sensing means for sensing the actual temperature at the location of usage and a memory unit that is addressable in dependence on the actual temperature values sensed by the sensor means and containing as stored data, preheating times to be read out corresponding to the respectively required heating time necessary to achieve the desired temperature for each of the various possible actual temperatures at the usage location. The switching control means is operable to actuate the heating device at a time prior to the preset time for commencement of usage that corresponds to the difference between the preset usage commencement time and the stored preheating time read out by the memory unit based upon the actual temperature values at the point of time prior to the preset usage commencement time.

Thus, instead of preprogramming a given turn-on time for a heating device as done in the prior art, as noted above, a preset instant at which a period of usage is to be commenced is preset, whereupon (within a suitable maximum time limit of, for example, one hour) preheating then is initiated on the basis of variables determined empirically before hand and the sensed actual temperature conditions so that the desired temperature is obtained precisely the instant the equipment is intended to be put into use.

Especially in the case of forced circulation heating systems, the procedure can be such that, at a predetermined time interval, for example, one hour before the respectively programmed usage commencement time, the actual temperature, for example, the temperature within the passenger space of an automotive vehicle, is measured and independence thereon, the turning-on time of the heater is predetermined with the aid of an arithmetic algorithm so that, at the intended instant at which usage is to be commenced, the desired temperature level will have been obtained. In this connection, it is particularly advantageous if the preheating times are determined on a basis of the time required by a given heating device to overcome a temperature difference between the various possible temperatures at the given location of usage and the temperature desired to be achieved at the commencement of usage and these preheating times are committed to storage.

Under circumstances wherein a preheating requirement may have to be especially intense, several heating stages can advantageously be utilized in accordance with the present invention, one of these heating stages being selected on the basis of a relay system at the time of presetting, or is adjusted automatically by a thermal probe. However, in general, a single preheating stage will suffice for constructional simplification, especially if the heat distribution period in the equipment to be preheated is relatively brief since, in such a case, there results only a brief period.

Selectively, the respective internal temperature or temperature difference (external-internal) may be utilized in accordance with the invention to determine the start of preheating and can be the temperature or temperature difference prevailing at the time at which preheating is commenced; alternatively, the temperature or temperature difference can be constantly controlled in order to readjust the turn-on time if heating up occurs too rapidly, for example, if the equipment is exposed to strong sunlight during preheating, so that the preheating unit is cut off and then reactivated later on. In the event that utilization of the equipment is not actually commenced at the preset usage commencement time, the temperature achieved during preheating can be subjected to regulation at a constant value after the desired temperature has been reached, i.e., after the preset usage commencement time is reached, a conventional two-position control is activated. In the case of heaters that operate with fresh air rather than re-circulated air, it is especially suitable to determine the preheating times for overcoming of the temperature difference between the actual temperature at the usage location and the desired temperature in dependence upon various possible ambient temperatures. Thus, in this instance, it is not only the actual temperature in the equipment to be heated, e.g., in the automobile, which is of importance, but also the outside air temperature which can differ, prior to start up of the preheating processor during the preheating period, from the actual internal temperature.

In accordance with the apparatus aspect of the present invention, the memory may utilize various appropriate devices of very different design of types that are known per se. In particular, it is contemplated that the different thermodynamic characteristics of different large equipment pieces to be preheated by the apparatus can be stored as respective time constant correction factors which, in the simplest case, may be a waiting variable that is settable with the aid of a multi-stage switch for the specific equipment involved. This waiting variable determines the turning-on time, coupled with the determined actual temperature or the determined temperature difference.

In accordance with a further feature of the present invention, in the case of an automobile heater preheating apparatus including an external temperature sensor, an ice warning signal can advantageously be connected therewith for indicating that the external temperature is low enough that roads might be icy. If a digital clock is present, its display can preferably be utilized for the ice warning indicator.

Additionally, the apparatus according to the present invention can utilize a timer for setting the usage commencement time that is able to provide switching between different time intervals without resetting of the specific time of usage commencement, for example, so as to enable preheating to commence at a given time every 24 hours during the week and then with a longer interval elapsing, when desired, for purposes of spanning weekends and vacations. Such long term programming is practical since the weather conditions during any subsequent period of usage need not be predicted.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 shows a schematic diagram of an apparatus in accordance with the present invention.

FIG. 3 shows a control panel of an apparatus according to the present invention.

FIG. 4 illustrates a time setting circuit and a legend table illustrating the operation thereof.

DETAILED DESCRIPTION OF THE PREFERRED EMBODIMENTS

Figure 1:
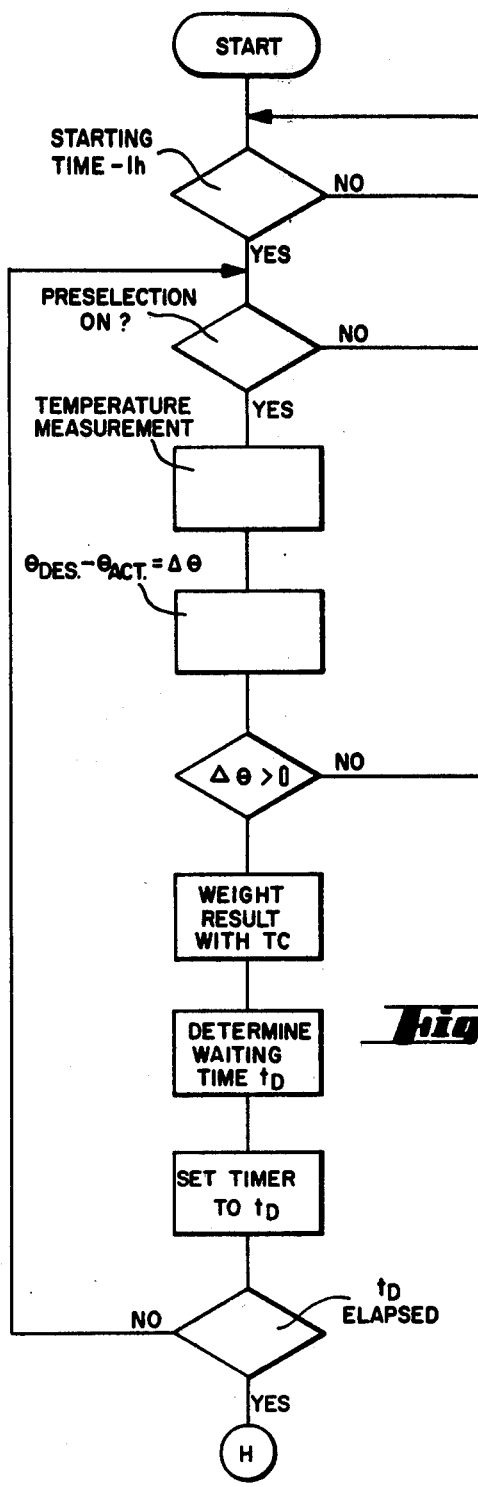
FIG. 1 shows a flow diagram for conducting of a preferred process in accordance with the present invention.

FIG. 1 shows a flow diagram illustrating one embodiment of the process according to the present invention. For the purpose of this example, the maximum preheating time is limited to one hour, but depending on the particular application, such can be made longer or shorter as conditions warrant. The processes for setting the preheating thus begin one hour before the chosen start up time since once the preheating process has been started no steps toward determining the length of the preheating time are commenced until the actual time is one hour before the starting time for commencement of the usage. Once this point in time is reached, if the preheating start up selection is on, then the actual temperature $\theta_{act}$ is measured one hour before start up. The difference $\Delta\theta$ between the actual temperature $\theta_{act}$ and the desired temperature $\theta_{des}$ is determined, and it is examined whether this difference is larger than zero. If this is the case, then the result is weighted by a coefficient dependent on the time constant of the equipment to be heated. For example, the time constant of a coupe based upon the thermodynamic characteristics thereof is utilized to calculate a waiting time $t_d$, indicating the time which should pass from one hour prior to use until the heater is turned on. A dead-time member "Timer" is set to this waiting period and transmits, after elapse of this period, a signal which turns on the heater H.

As long as the waiting time $t_d$ has not as yet elapsed, $t_d$ can, if desired, be continuously recorrected, by continuously further determining $\Delta\theta$ and processing same. In case of a considerable change in conditions, for example, in case of heating from the outside such as from an increase in sunshine, $\Delta\theta$ becomes constantly smaller during the waiting period, unless the instant of turning on of the heater is constantly pushed back. The weighting of the result of the temperature difference determination and the calculation of the waiting period depend upon the equipment to be heated, i.e. in case of a car heater on the automobile to be heated, and the appropriate values are to be stored beforehand and/or adjusted beforehand. For a given vehicle type, the corresponding processing member can be fixedly preset. Especially, if this processing member is designed as a fixed (read-only) memory, it can take into account, besides the heat-time constants, also the heat losses noticeable upon progressive heating. For this purpose, the external temperature of the vehicle can likewise be measured continuously and be included in the determination of the waiting period $t_d$.

FIG. 2 schematically illustrates an apparatus for conducting the process of the present invention in a somewhat modified embodiment. A switching control indicated generally by the reference numeral 50 comprises a clock 1, shown as a conventional dial clock, but preferably being a digital clock and a presetting member 2 comparable to a clock alarm feature, the time indication and signal transmission of which are the same as the corresponding functions of the clock 1. The clock 1 transmits an output signal indicating the instantaneous time, whereas the time presetting unit 2 yields a signal indicating in the same code, the time set therein for commencement of the intended period of usage.

In a component illustrated as a subtractor 3, the output signal of the presetting unit 2 is modified so that it indicates a time which is earlier by one hour. Thus, an hour is subtracted therein. The output signals from the clock 1 and the subtractor 3 are compared with each other in a comparator 4. The comparator 4 consequently indicates a signal identity one hour before the preset time and turns on the current supply for the equipment parts shown in FIG. 2 below the dot-dash line with the aid of a switch 5. The output signal of the presetting unit 2 is furthermore modified in a subtractor 6 in a fashion comparable to that of subtractor 3, i.e., by subtraction of a time span which, however, in this case does not amount to one hour as a constant, but rather is variable. How this signal is obtained will be described below. The output signal of the subtractor 6 is compared in a comparator 7 with the output signal of the clock 1; this comparator, in case of signal identity, turns on the heater with the aid of switch 8.

A presettable, desired-temperature setting unit 9 and an actual-temperature value sensor 10 (which measures the actual temperature of the equipment or location to be heated, for example a vehicle interior) each provide a signal to a subtractor 11 which produces a temperature difference signal as its output. The temperature difference signal is fed to a memory unit 12 as an address signal. Optionally, an external-temperature value sensor 13 may also be provided; the output signal of this sensor indicating the temperature outside of the automobile, for example, is likewise fed to the memory unit 12 as an address signal. Due to this addressing procedure, the memory unit 12 will transmit, as the read-out signal, a signal indicating a time span to be deducted from the time set at the presetting unit 2 so that an earlier point in time results. The output signal of the memory 12 is thus transmitted to the subtractor 6 as a minus signal.

The memory unit 12 preferably involves a programmed fixed (read-only) memory, the programming of which was effected in dependence on the equipment to be heated. In the case of an automobile preheating device, it is thus possible to empirically determine, for a certain vehicle type, for all the possible mutual relationships of the desired temperature, the actual temperature, and the external temperature, the required heating time until the desired temperature has been reached, and this value can be committed to storage. By reading out the corresponding time values, which then takes place during operation, the turning-on process of the heater will be performed with the circuit of FIG. 2 in such a way that the desired temperature is reached at the preset usage commencement time in the presetting unit 2. The comparator 7 holds the switch 8 closed at its input, not only in a case of signal identity, but also if the signal from clock 1 indicates a later time than the signal from the subtractor 6, insofar as the maximum preheating time of one hour has not as yet elapsed.

A comparator 14 compares the output signals of the clock 1 and of the time presetting unit 2 and thus determines the preset instant of usage. At the point in time when the desired temperature should have been reached or, optionally in the case of a corresponding setting, several minutes later, the comparator 14 activates a two-position controller 15 with its own current supply and immediately thereafter, with the aid of switch 5, turns off the current supply for the equipment located underneath the dot-dash line, except for the two position controller 15, but including its own power supply. The temperature is now maintained with the aid of the two-position controller 15, if the user is late. If desired, still another comparator 30 may optionally be connected between the output lines of the clock 1 and the presetting unit 2 with a subtractor 35 inserted in the output signal line of the clock 1, wherein again a signal corresponding to one hour or corresponding to a different time span is fed to the subtractor. This additional comparator 30 can deactivate the entire heating unit again after elapse of this further hour or another time span, so that, if user does not come at all, the preheating is terminated again to save energy.

It is understood that, under practical conditions, the clock and the time presetting unit 2 are suitably combined and the separate illustration thereof in FIG. 2 is only to facilitate an understanding of the mode of operation thereof. If the adjustability of the desired temperature is to be omitted, and preheating is to be carried out in all cases only to a predetermined, identical temperature level, then members 9 and 11 of FIG. 2 may be eliminated. In such a case, the memory 12 will then give a fixed correlation between the actual temperature (for example, as measured by the sensor 10 one hour prior to the selected usage commencement time) and the preheating time, as well as optionally, with consideration of the external temperature measured by sensor 13.

It is assumed in the illustration of FIG. 2 that the members 9, 10, and 13 transmit digital output signals. Otherwise, corresponding signal converters will be provided between these members and the memory unit 12. The arrangement of FIG. 2 except for the temperature detection and the time indication, can be realized in the form of a microprocessor.

FIG. 3 illustrates a possible control panel with a preheating unit. A digital indicator 16 displays, when pressing a button 22 the time measured by the clock 1. After actuating a button 21, however, the time set in the presetting unit 2 is indicated by means of the display 16. To change this preselected time, one of two buttons 17 and 18 can be depressed, the presetting time then being adjusted forwards or backwards depending upon which of these buttons has been touched. The desired temperature can be set at a desired-temperature selector 19 equipped with an adjusting knob. With the aid of a button 20, an immediate turning on of the heater can be accomplished in a conventional manner. The ON-OFF button 21 determines whether or not preheating is actually to be carried out for the preset time.

If a capability of alternatively selecting between multiple preselected times is to be provided, a changeover therebetween can be effected by multiple touching of the button 21 by designing the circuit accordingly. Two light-emitting diodes 23 (LED's) each of which represents one of the preset times, can be utilized to identify which starting time has been preselected. Additionally, provision may be made to shift, with the aid of button 20, the preselected program, by lightly touching the key once, by 24 hours, and by lightly touching the key twice, by 48 hours; the digital display is shown with two indicators for representing actuation of either of such delays. Such a delay feature, enables the preselection range to be enlarged, without loss of accuracy and without changing of the usage commencement time up to 72 hours so as to enable operation over a weekend or holiday.

In an automotive vehicle, the external temperature sensor 13 may also be utilized as part of an icy road warning device. For example, at external temperatures of below 3° C., as determined by comparator 24, an ice warning device 25 can be actuated so as to cause the word ICE, for instance, to flash at the digital display 16 in place of the sequence of numerals.

FIG. 4 illustrates a possible circuit for effectuating the forwards and backwards operating adjustment for the presetting unit 2. For this purpose, the two buttons 17 and 18, for example, have two respective setting positions and one rest position, so that a total 6 possible positions are attainable. The combinations of button positions are binary coded on a three-wire line $A_1$, $A_2$, $A_3$, in accordance with the table legend shown in FIG. 4, and indicate the respective functions of forward slow, forward fast, backward slow, and backward fast as well as a zero reset position achieved by placing both of the buttons 17, 18, in their fast position.

UDD represents the terminal for the supply voltage of the digital display. This is a constant voltage which, dependent on the positions of the switches shown is or is not applied to one or more of lines $A_1$, $A_2$, $A_3$, respectively.

While I have shown and described various embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

We claim:

1. Preheating process for automatically applying a quantity of heat energy sufficient to achieve a desired temperature at a location within a motor vehicle prior to a period of usage, comprising the steps of:
   (a) determining the respective preheating times required to achieve said desired temperature for various possible actual temperatures at said location on the basis of the time required by a heating device to overcome a temperature difference between the various possible temperatures at said location and said desired temperature in dependence on various possible ambient temperatures outside of said motor vehicle;
   (b) storing the preheating times determined in step (a);
   (c) predetermining a time for commencement of said period of usage;
   (d) at a predetermined point of time prior to said usage commencement time, automatically determining a correct preheating time from said stored preheating times for use based upon actual temperature conditions at said location and the actual ambient temperature outside of said motor vehicle; and
   (e) automatically commencing application of heat to said location at a time prior to said usage commencement time that corresponds to the difference between said usage commencement time and the correct preheating time determined in step (d).

2. Process according to claim 1, characterized in that the preheating times determined in step (a) are determined for only a single heating stage, and only this single heating stage is used for heating.

3. Process according to claim 1, wherein said predetermined point of time in step (d) is equal to a maximum preheating time.

4. Preheating apparatus for automatically applying a quantity of heat energy sufficient to achieve a desired temperature at a location within a motor vehicle prior to a period of usage, comprising:
   (a) a heating device;
   (b) a presettable timer actuted switching control means for actuating said heating device;
   (c) an actual temperature value sensor means for sensing the actual temperature at said location;
   (d) an external temperature sensor means for detecting actual ambient temperatures outside of the motor vehicle; and
   (e) a memory unit that is addressable in dependence on the actual temperature values sensed by said sensor means and containing, as stored data, preheating time spans required for said heating device to overcome a difference between various possible actual temperatures at said location and an adjustable desired temperature in dependence upon various possible ambient temperatures outside of said motor vehicle;
   wherein said switching control means is operable to actuate said heating device at a time prior to a preset time for commencement of usage that corresponds to the difference between said preset usage commencement time and a stored preheating time read out by said memory unit based upon actual temperature values sensed by said sensor means at a point of time prior to the preset usage commencement time.

5. Apparatus according to claim 4, characterized in that, during use of said apparatus, the switching control means is constantly turned on and in that said sensor means and said memory unit are activated by the switching control means at said point of time prior to the usage commencement time.

6. Apparatus according to claim 5, wherein said switching control means is operable to produce said activation of said memory unit and sensor means at a time prior to said usage commencement time that is equal to a maximum preheating time.

7. Apparatus according to claim 4, wherein the memory unit is constructed to enable data to be manually committed to storage in the memory unit.

8. Apparatus according to claim 7, wherein the memory has a weighting circuit for its stored data, and wherein the magnitude of weighting produced by the weighting circuit is presettable.

9. Apparatus according to claim 4, wherein the memory has a weighting circuit for its stored data, and wherein the magnitude of weighting produced by the weighting circuit is presettable.

10. Apparatus according to claim 9, characterized in that the memory unit has the characteristics of a programmable fixed memory.

11. Apparatus according to claim 4, characterized in that the memory unit has the characteristics of a programmable fixed memory.

12. Apparatus according to claim 11, characterized in that the memory unit is a function generator which transmits a value indicating the time span between the time for actuation of the heating device and the preset usage commencement time solely in dependence on the actual temperature value sensed by the sensor means at a fixed time span before the preset usage commencement time.

13. Apparatus according to claim 10, characterized in that the memory unit is a function generator which transmits a value indicating the time span between the time for actuation of the heating device and the preset usage commencement time solely in dependence on the actual temperature value sensed by the sensor means at a fixed time span before the preset usage commencement time.

14. Apparatus according to claim 11, characterized in that the memory unit is a function generator to which is fed a variable indicating the difference between the actual temperature sensed at said location and the desired temperature, and which transmits a variable indicating the time span between the time for actuating of the heating device and the preset usage commencement time.

15. Apparatus according to claim 4, characterized in that an ice warning device is connected with the external temperature sensor.

16. Apparatus according to claim 15, characterized in that the switching control means comprises a digital clock which can be set forwards and backwards for setting said usage commencement time.

17. Apparatus according to claim 16, characterized in that the digital clock comprises a digital display which is also connected with the ice warning device, said display being controllable by the ice warning device for indicating an ice warning when said external sensor senses a temperature below a predetermined value.

18. Apparatus according to claim 4, characterized in that the switching control means comprises a digital clock which can be set forwards and backwards for setting said usage commencement time.

19. Apparatus according to claim 4, wherein said actual temperature sensor means is operable to sense temperature values in a passenger compartment of the motor vehicle.

20. Apparatus according to claim 4, wherein said switching control means comprises delayed usage means for maintaining said actual temperature at said desired temperature, once said desired temperature is reached.

21. Apparatus according to claim 4, wherein said switching control means comprises safety means operable to deactivate said heating device predetermined period of time after said usage commencement time has elapsed, whereby protection against lack of actual usage is provided.

22. Apparatus according to claim 4, characterized in that said switching control means comprises a timer for presetting the usage commencement time and timing members connected with the timer, said timing members being settable for adding one or more multiples of a clock dial revolution to the usage commencement time set by said timer for enlarging the range of presettable usage commencement times without resetting of said timer.

* * * * *